Sept. 27, 1938.  W. R. HARDY  2,131,659
CULTIVATOR
Filed Aug. 2, 1937  4 Sheets-Sheet 2

Inventor
William R. Hardy.
By Lacey & Lacey, Attorneys

Sept. 27, 1938.   W. R. HARDY   2,131,659
CULTIVATOR
Filed Aug. 2, 1937   4 Sheets-Sheet 4

Inventor
William R. Hardy.
By Lacey & Lacey, Attorneys

Patented Sept. 27, 1938

2,131,659

UNITED STATES PATENT OFFICE 2,131,659

CULTIVATOR

William R. Hardy, Austin, Tex.

Application August 2, 1937, Serial No. 157,026

3 Claims. (Cl. 97—168)

This invention relates to a cultivator and one object of the invention is to provide a device of this character which may be constructed to form a straddle-row cultivator and consists of companion units adjustable transversely of each other in order that they may be properly disposed at opposite sides of a row of growing plants and work the ground without injuring the plants.

Another object of the invention is to provide connecting means for the companion units so constructed that the plants will not be damaged when the cultivator is in use even if the plants have grown to some height.

It is another object of the invention to provide connecting means for the units which may be detached therefrom and thus permit a single unit to be used. It will thus be seen that the implement may be used as a straddle-row cultivator or as a single cultivator.

Another object of the invention is to provide each unit with an improved shield mounted for vertical adjustment and thus adapt it to be moved into proper position for preventing dirt from being thrown upon the growing plants during cultivation thereof.

It is another object of the invention to provide each cultivator unit with improved skids adapted to limit the extent to which cultivator blades may enter the ground and also to serve as guards which will permit the cultivator to pass over a large rock or other obstruction without damaging the cultivator blade.

Another object of the invention is to provide a cultivator wherein the framework thereof consists of longitudinally extending bars adapted to be adjusted transversely and thus permit the cultivator to be properly proportioned for movement between rows of growing plants.

Another object of the invention is to provide each unit with an improved draft means connected with all of the longitudinally extending bars of the unit and thus cause strain to be evenly distributed when the cultivator is in use.

Another object of the invention is to provide a cultivator wherein each unit is of a strong and durable construction and consists of a comparatively few number of parts.

The invention is illustrated in the accompanying drawings, wherein—

Figure 2:
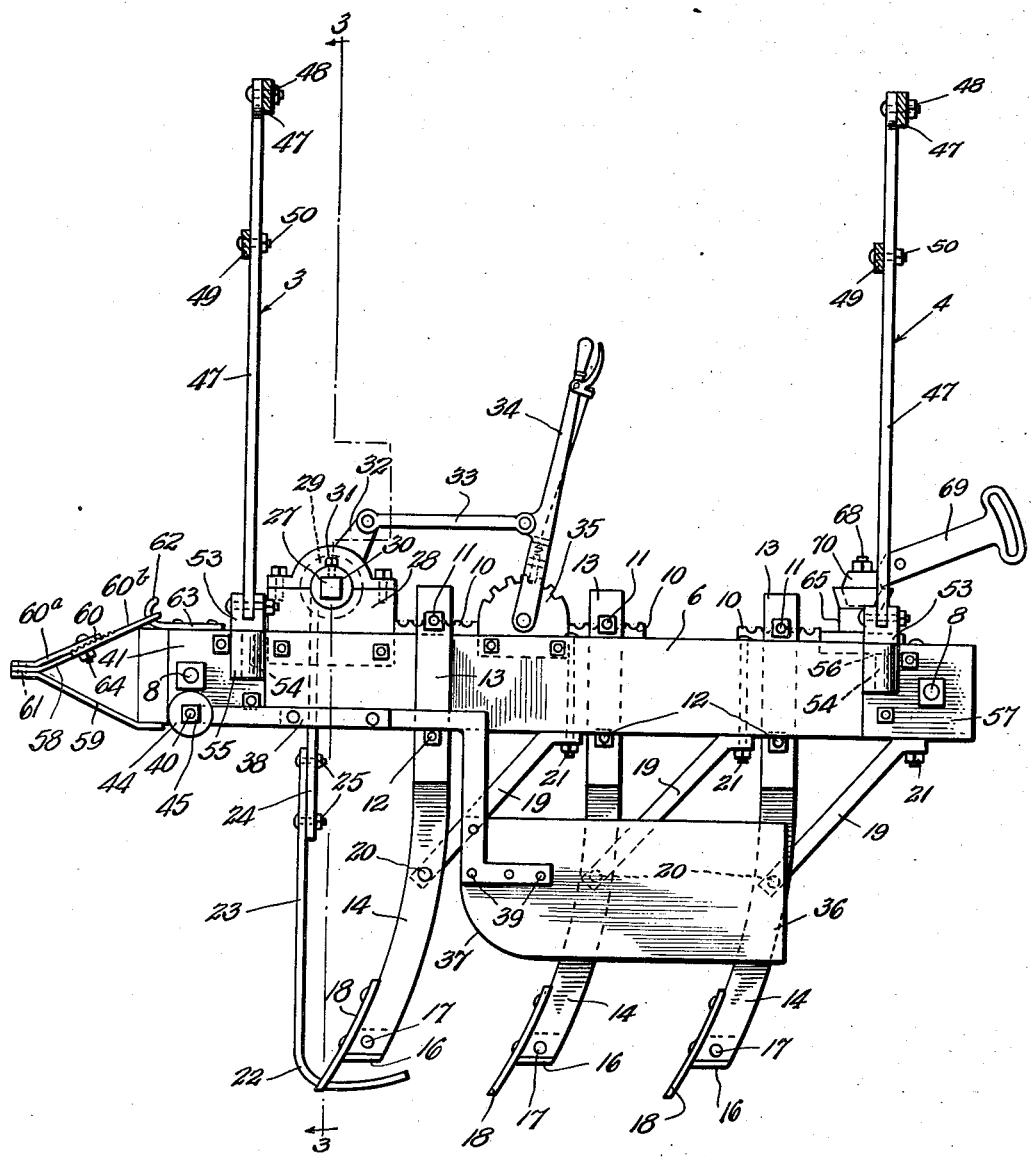
Figure 2 is a side elevation of one unit of the cultivator.
Figure 3:
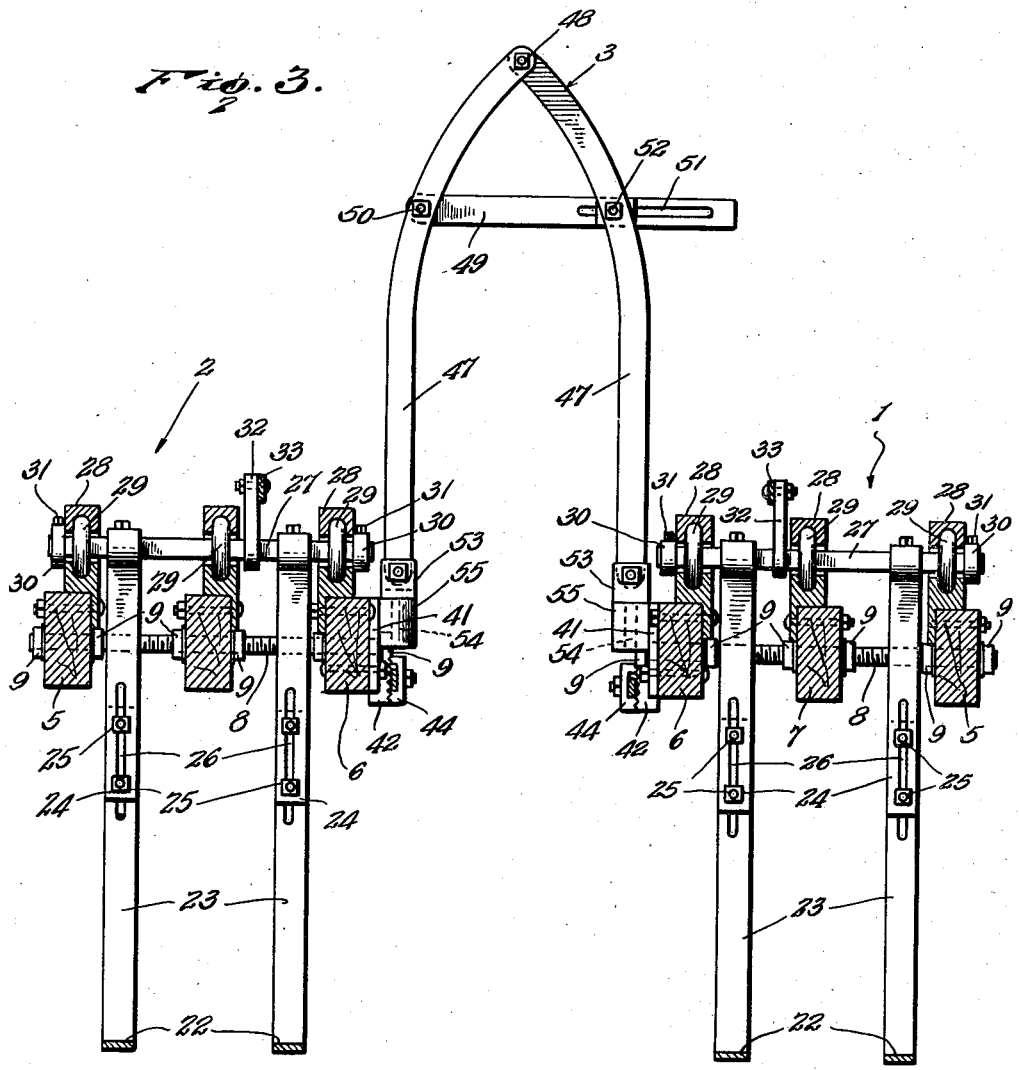
Figure 4:
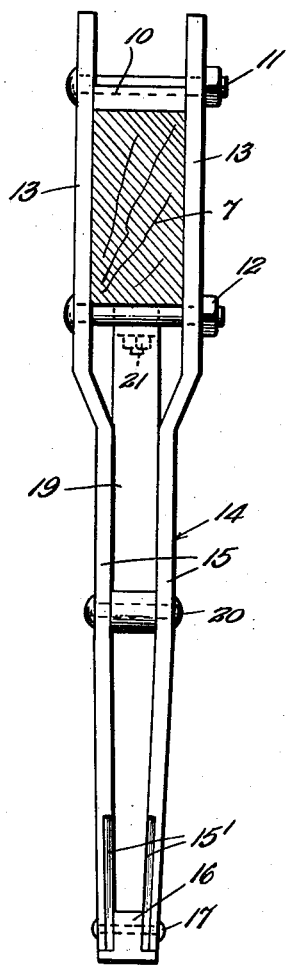
Figure 5:
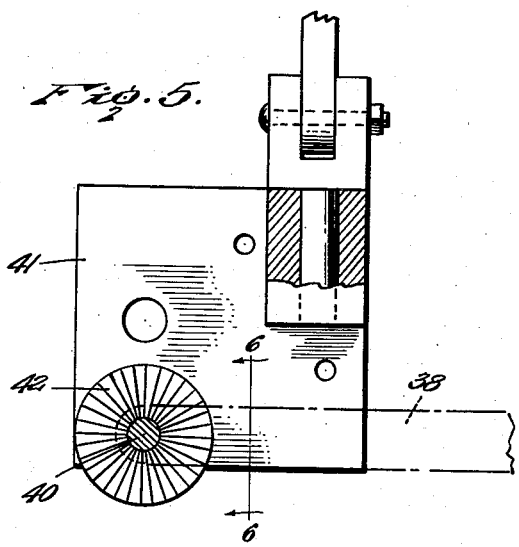
Figure 7:
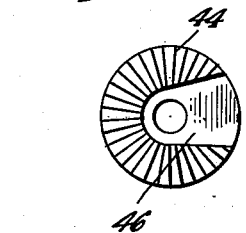
Figure 6:
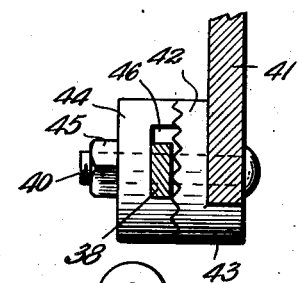
Figure 8:
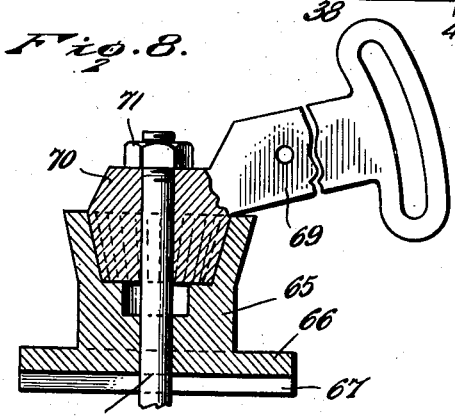

Figure 3 is a vertical sectional view taken transversely through the cultivator, the view being along the line 3—3 of Figure 2 but showing both units of the cultivator, Figure 4 is an enlarged fragmentary view illustrating the construction of one of the arms carrying the cultivator blades, Figure 5 is a fragmentary view illustrating the construction of the mounting for the guard and the yoke which connect the units of the cultivator, Figure 6 is a sectional view taken vertically through the mounting plate and the arm of the guard, the view being along the line 6—6 of Figure 5, Figure 7 is a view looking at the inner face of the support for the forward end of the arm of the guard, and Figure 8 is a sectional view upon an enlarged scale illustrating the manner in which a mounting for a cultivator handle is constructed.

This improved straddle-row cultivator consists of companion units which are indicated in general by the numerals 1 and 2 and are connected in transverse spaced relation to each other by front and rear yokes or bridging members 3 and 4. The bridging members extend upwardly above the units 1 and 2 for quite a distance, as shown in Figure 3, so that, when corn or other tall plants are being cultivated, there will be ample room to permit cultivation without danger of damaging the plants by striking upper portions thereof. The yokes are also so constructed that the two units may be shifted toward and away from each other and thus permit them to be so spaced that the soil at opposite sides of a row of plants may be cultivated without likelihood of damage to the plants. It should also be noted that each unit is itself transversely adjustable in order that its width may be regulated and thus the units caused to be of the proper width to be accommodated between rows of plants.

Figure 1:
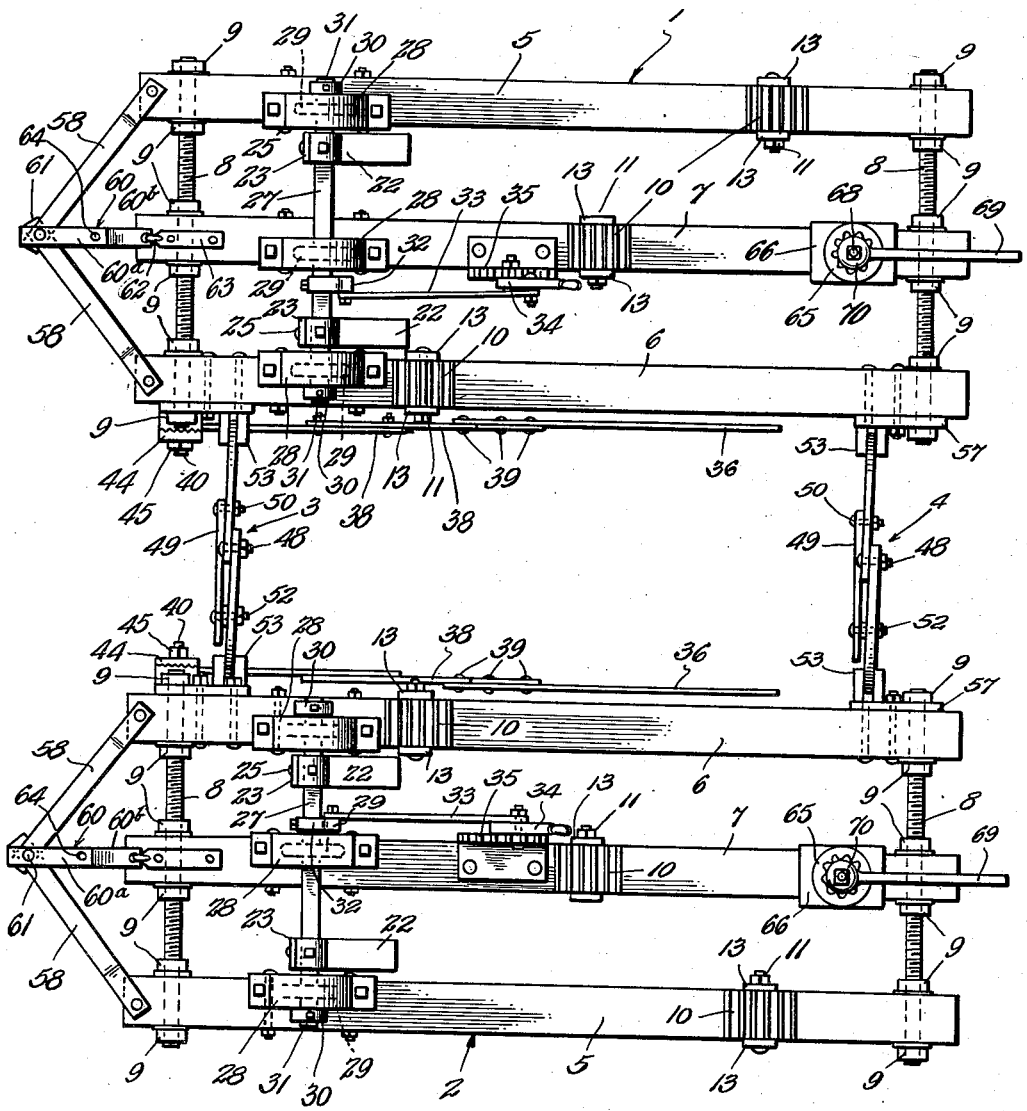
Figure 1 is a top plan view of the double-row cultivator.

The units are of a duplicate construction and therefore, one will be described in detail. Referring to Figures 1 and 3, it will be seen that each unit has an outer side bar 5, an inner side bar 6 and an intermediate bar 7. These bars may be formed of wood or metal but are preferably of wood and of such dimensions in cross section that they will have the needed strength. Openings are formed transversely through the bars adjacent front and rear ends thereof to receive the threaded rods 8 upon which are mounted securing nuts 9. These nuts engage the bars from opposite sides thereof, and when they are tightened, the bars will be firmly gripped and held in transverse spaced relation to each other. By loosening the nuts the bars may be shifted along the rods and the nuts again tightened. It will thus be seen that the bars may be shifted along the rods into position to provide a unit of a desired width and the unit thus accommodate itself to the space between those of growing plants which are to be cultivated. Racks or saddles 10 which are formed of metal are secured upon upper faces of the bars 5, 6 and 7 and are formed with transversely extending grooves which are spaced from each other longitudinally of the bars. These grooves are formed in the saddles 10 to receive the upper bolt 11 which together with the lower bolt 12 secure the arm 13 of the blade holders 14 to the bars. Referring to Figure 4, it will be seen that each blade holder is formed from a pair of strong metal strips 15 having their upper portions bent to form the arm 13 and having their lower ends secured against opposite side faces of a shoe 16 by a bolt 17. Portions of the shoe or blocks 16 engage under lower ends of the bars or strips 15. Cultivator blades 18 are secured to the block in front of the lower end portions of the strips 15 with their lower portions projecting downwardly therefrom for working engagement with the soil as the cultivator is moved forwardly, and in order to brace the blade carriers against rearward movement, there have been provided braces 19 which are formed of strong metal and have their lower forward ends secured between the side strips of the blade carriers by bolts 20 and their upper or rear ends secured against the under faces of the bars 5, 6 and 7 by bolts 21. By loosening the bolts 11 and 12 the blade carriers may be shifted about the bolts 20 and angularly adjusted so that the depth to which the blades cut into the ground when the cultivator is moved forwardly will be regulated. The strips 15 are provided along inner sides of the lower end portions with beveled faces 15' in order that, when blades having round bottomed fastenings are in use, these blades may be adjusted towards or away from the plants.

In order to permit the cultivator to move forward easily and prevent damage by the blades striking a large rock or other obstruction in a field, there have been provided skids 22 which are formed from strips of strong metal. Each skid has a vertically extending shank 23, the upper end portion of which is secured to the lower portion of an arm 24 by bolts 25, and upon referring to Figure 3, it will be seen that the bolts 25 extend through slots 26 formed longitudinally of the arm 23. The shank may, therefore, be adjusted longitudinally of the arm to adjust the skids relative to the lower ends of the blade carriers and control the depth to which the blades will enter the ground when the cultivator is in operation. When the cultivator is moved forwardly, the skids slide along the ground and the blades will dig into the soil and break it up. If a large rock or other obstruction is encountered, the skids will ride over it and thus elevate the cultivator and prevent the blades from striking the obstruction and being broken or otherwise damaged. The arms 24 are secured at their upper ends to a shaft 27 which is rectangular in cross section and extends through bearings 28 carried by and extending upwardly from the bars 5, 6 and 7. Referring to Figure 3, it will be seen that within each bearing is disposed a roller 29 through which the shaft extends. The shaft will thus be rotatably mounted in the bearings but since the rollers are not fixed to the shaft the bearings and the rollers may be shifted along the shaft when the bars 5, 6 and 7 are shifted toward or away from each other. Collars 30 which fit about ends of the shaft and are secured by set screws 31 engage outer side faces of the bearings carried by the bars 5 and 6 and prevent the shaft from having longitudinal play. An arm 32 extends upwardly from the shaft and at its upper end is pivotally connected to a link 33 which connects the lever arm 32 with a latch lever 34. This latch lever is pivotally carried by a rack 35 secured upon the upper face of the center bar 7, and from an inspection of Figure 2, it will be readily understood that, when the latch of the latch lever is released from the rack, the latch lever may be actuated to impart rotary motion to the shaft 27 and swing the arms 24 to move the skids to an adjusted position. When the lever is swung forwardly, the skids will be raised and may be swung upwardly to a position level with the tops of the beams where they will be entirely out of the way of plants. By swinging the lever rearwardly the skids may be swung downwardly to engage the ground and prevent the blades from running too deeply into loose ground or the skids may, when proper adjustment as to length is made, be swung downwardly to such a position that points of the blades will be above the ground. The cultivator can then be moved from place to place without the blades cutting into the ground as their heel portions will rest upon the ground and their points be disposed out of an operative position.

It is desirable to prevent small plants from being covered by dirt or otherwise injured by soil broken up when the cultivator is in use, and in order to do so, each of the units is provided at its inner side with a shield formed of a strong metal plate which is of substantially oblong shape but formed with a curved lower forward corner portion, as shown at 37, so that this forward portion of the blade may move along the ground without catching. A longitudinally adjustable shank or tongue 38 formed of metal strips bolted to each other extends upwardly and then forwardly from the shield, and upon referring to Figure 2, it will be seen that the rear portion of this shank or tongue 38 not only extends vertically along the forward portion of the shield but also longitudinally thereof and is firmly secured by rivets or equivalent fasteners 39. It is important to have the shanks 38 adjustable longitudinally as this enables the operator to adjust the shields and dispose them in position to protect plants from dirt thrown either by front plows or plows carried by the middle beams, when the beams are adjusted to bar off and sweep up, using a sweep on the foot of each middle beam to sweep up with. At its forward end each shank or tongue is formed with an opening through which is engaged a stem or bolt 40 carried by a plate 41 secured against the outer side face of the forward portion of the inner bar 6 of the unit. A block 42 which is formed of strong metal fits about the bolt against the plate and is formed with an extension 43 which engages under the lower edge of the plate and prevents the block from turning about the bolt. A companion face 44 fits about the bolt and the confronting faces of the block are formed with interfitting teeth, as shown clearly in Figures 5, 6 and 7, so that, when the nut 45 is loosened, the block 44 may be turned about the bolt and be then secured in an adjusted position by tightening the nut. The face of the block 44 which confronts the block 42 is recessed, as shown at 46, to provide a pocket opening rearwardly and receiving the forward end portion of the shank or tongue 38. By this arrangement the shank will be supported by the block 44 but it may have a certain amount of vertical swinging movement when the cultivator is in use. Therefore, the shield will be permitted to ride easily over rocks and other obstructions which may be encountered. By loosening the nut the shield may be adjusted vertically to move it into proper relation to the ground and as the cultivator is moved forwardly the two shields will serve very effectively to prevent dirt from being thrown upon small plants and smothering them or being piled too high about large plants.

The front and rear bridges or yokes 3 and 4 are of a duplicate construction and each consists of a pair of legs 47 which have their lower portions straight and their upper portions curved towards each other and secured to each other by a pivot pin or bolt 48. A cross bar 49 extends transversely of the curved upper portions of the legs 47 and has one end pivoted to one of the legs by a pivot pin or bolt 50 and its other end portion extending in crossing relation to the other leg and formed with a longitudinally extending slot 51 through which a bolt 52 passes. Therefore, the legs may be swung toward or away from each other and the bridge adjusted to dispose the two units in desired spaced relation to each other. Shoes 53 are pivoted to lower ends of the legs 47 and are formed with depending stems 54, the stems of the shoes carried by the legs of the front yoke being engaged in sockets 55 carried by the plate 41 at the front ends of the bars 6 and the pins of the shoes carried by the legs of the rear yoke being engaged in sockets 56 carried by plates 57 which are secured against rear portions of the bars 6. In view of the fact that the yokes are adjustable, the two units may be spaced from each other a sufficient distance to provide ample room for corn or other tall crop to pass between the arms of the yoke. Since the yokes or bridges are mounted in the socket, they can be very easily detached from the units when it is desired to use a single unit as a single cultivator instead of using the implement as a straddle-row cultivator.

In order that the cultivator may be moved forwardly by draft animals, each unit is provided with a hitch formed as shown in Figures 1 and 2. Referring to these figures, it will be seen that upper and lower metal strips 58 and 59 are secured to upper and lower faces of front end portions of the side bars 5 and 6. These strips 58 and 59 converge forwardly and the pairs of strips carried by the two bars also converge forwardly so that the front ends of all of these strips intersect midway the width of the unit in spaced relation to the front end of the intermediate bar 7. A center strip 60 formed of front and rear sections 60ᵃ and 60ᵇ extends forwardly from the front end of the center bar or beam 7 and through the intersecting front ends of the strips 58 and 59 and forward section 60ᵃ of the center strip 60 passes a rivet or equivalent fastener 61 which firmly holds the strips together but permits them to have pivotal movement relative to each other when the side bars or beams 5 and 6 are shifted along the rods 8 to adjust the width of a unit. The rear section 60ᵇ of the center strip is engaged with the bill 62 of an anchoring member 63 carried by the center beam and the two sections are held in engagement with each other by a bolt 64 which passes through an opening formed in the front section 60ᵃ and through a slot formed longitudinally of the rear section 60ᵇ. Confronting faces of these two sections are formed with transversely extending ribs or teeth so that, when the bolt 64 is tightened, slippage of the two sections longitudinally of each other will be prevented. Draft equalizers may be connected with the forward ends of the draft appliances in any desired manner.

Adjacent its rear end the center beam of each unit carries a socket 65 formed with a base 66 which rests upon the upper face of the beam and has depending side flanges 67 engaging opposite side faces of the beam to prevent the socket from turning about the bolt 68. This bolt is of sufficient length to extend entirely through the center beam with its upper portion projecting above the socket 65. An arm 69 which is formed of strong metal and to which a cultivator handle is to be secured extends rearwardly of the unit from the socket, and at its front end is formed with a head or block 70 which is circular in cross section and has a downwardly tapered lower portion, as shown in Figure 8. This lower portion of the head fits into the tapered socket and confronting surfaces of the head and walls of the socket are formed with ribs or teeth which interengage when the securing nut 71 of the bolt 68 is tightened. Therefore, the block or head 70 will be held against turning in the socket and the handle-engaging arm will be firmly held in its proper position. A handle mounting has been shown applied to the middle beam of each unit as this is the manner in which the handles will be mounted when the two units are in use. When a single unit is used, the handle mountings will be transferred to the side beams of the unit in use and thus provide the unit with two handles.

One great advantage this cultivator has over all carriage cultivators is that in plowing rows on hillside land where rows circle around the hill, the carriageless cultivator because of the absence of wheels to lead it downhill is forced, each section, to follow directly behind the mule pulling it which forces the plows of each section to run parallel with the drill being plowed, thereby enabling the operator to do good work because the dirt is evenly distributed to the plants which is impossible where the plows do not run parallel with drill being plowed.

Again, it is frequently the case, that all plants in a row are not of the same size. Therefore, the larger plants will require and will take more dirt than the smaller plants which can be accomplished with the carriageless cultivator by removing the rear bridge or drill gauge, but leaving the front drill gauge in place set to any width desired, which will allow the operator with just a little pressure outward on handles to widen the sections and put the required amount of dirt to the smaller plants and, when smaller plants are passed, by releasing the handles the mules using the front drill gauge as a fulcrum will naturally swing the rear end of the sections back to the former position or in parallel position to drill being plowed which is quite an advantage.

Another great advantage, especially to the sandy land farmer, is the barring off and sweeping up a row at one trip instead of four trips as is the custom with most all sandy land farmers. This operation can be done by putting "twister" shovels (rights and lefts) on the front feet of cultivator and adjusting the bridge or row drill to the desired position, to allow "twisters" to run as near the drill as may be necessary to remove all vegetation from sides of drill. By adjusting the middle beams any size sweep desired may be used to sweep up with and the wing of the sweep running next to drill will have nothing but dirt that is clear of all vegetation to put around the plants. By adjusting the middle beam to a position near the inside beam or beam next to drill a small sweep can be used, and the further from the inside beam that the middle beam is set, the larger the sweep-up sweep can be. Whether a small or a large sweep is used in this operation, the wing of the sweep which throws dirt to the plants will have dirt perfectly clear of vegetation to put around the plants which is a great advantage over any other cultivator in use.

Having thus described the invention, what is claimed as new is:

1. In a cultivator, a frame having longitudinally extending beams spaced transversely from each other, rods extending transversely of said beams through openings formed therein, securing members carried by said rod and engaging said beams to secure the beams in adjusted position and permit transverse adjustment of the beams along the rods, blade carriers extending downwardly from said beams, bearings carried by said beams, rollers rotatably mounted in said bearings, a shaft extending through the rollers and the bearings and rotatably mounted by the rollers, arms extending downwardly from said shaft and having their lower ends provided with ground-engaging members, a lever arm carried by said shaft, and a latch lever carried by one beam and connected with the lever arm whereby said shaft may be rotatably adjusted to swing its arm vertically and adjust the position of the ground-engaging members relative to the ground and blades carried by the lower ends of the blade carriers.

2. In a cultivator, a frame having longitudinally extending side beams and a longitudinally extending intermediate beam, means for securing the beams in adjusted transverse spaced relation to each other, and draft means comprising upper and lower strips secured to the front end of each side beam and converging forwardly with the front ends of all of the strips overlapped in spaced relation to the front end of the intermediate beam, an anchoring member carried by the front end of the intermediate beam, a longitudinally adjustable strap having its rear end engaged with said anchoring member and its front end disposed in overlapping relation to the front ends of the first-mentioned strips, and a fastener passing through the overlapped ends of the strap and strips to connect the same with each other and permit pivotal movement thereof when the beams are adjusted transversely of each other.

3. In a cultivator, a frame having longitudinally extending beams spaced transversely from each other, blade carriers extending downwardly from said beams, bearings carried by said beams, rollers rotatably mounted in said bearings, a shaft extending through the rollers and the bearings and rotatably mounted by the rollers, arms extending downwardly from said shaft and having their lower ends provided with ground-engaging members, a lever arm carried by said shaft, and a latch lever carried by one beam and connected with the lever arm whereby said shaft may be rotatably adjusted to swing its arm vertically and adjust the position of the ground-engaging members relative to the ground.

WILLIAM R. HARDY.